United States Patent
Lee

(10) Patent No.: US 12,077,223 B2
(45) Date of Patent: Sep. 3, 2024

(54) STOPPER AND DRIVER FOR STEERING APPARATUS HAVING THE SAME

(71) Applicant: HL MANDO CORPORATION, Pyeongtaek (KR)

(72) Inventor: Kyeongho Lee, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 116 days.

(21) Appl. No.: 17/577,452

(22) Filed: Jan. 18, 2022

(65) Prior Publication Data

US 2022/0242477 A1 Aug. 4, 2022

(30) Foreign Application Priority Data

Feb. 1, 2021 (KR) .......................... 10-2021-0013991

(51) Int. Cl.
*B62D 5/04* (2006.01)

(52) U.S. Cl.
CPC ......... *B62D 5/0454* (2013.01); *B62D 5/0403* (2013.01)

(58) Field of Classification Search
CPC ..... B62D 5/0454; B62D 5/0403; F16H 55/24; F16H 2057/0213
See application file for complete search history.

(56) References Cited

U.S. PATENT DOCUMENTS

| | | | | |
|---|---|---|---|---|
| 6,708,796 B2 * | 3/2004 | Kinme | .................. | F16H 57/021 74/427 |
| 9,193,384 B1 * | 11/2015 | Murakami | .............. | F16H 55/24 |
| 2011/0147113 A1 * | 6/2011 | Ko | ......................... | F16H 57/039 180/444 |
| 2013/0075189 A1 * | 3/2013 | Sekikawa | ............... | F16C 23/08 180/444 |
| 2014/0041475 A1 * | 2/2014 | Ko | .......................... | B62D 3/04 74/427 |
| 2019/0185054 A1 * | 6/2019 | Oh | ......................... | F16F 1/445 |
| 2019/0337554 A1 * | 11/2019 | Park | ..................... | B62D 5/0454 |

FOREIGN PATENT DOCUMENTS

| | | | | |
|---|---|---|---|---|
| DE | 102020105170 A1 * | 9/2020 | .............. | B23P 19/02 |
| KR | 20180094310 A * | 8/2018 | ........... | B62D 5/0454 |
| KR | 20180094600 A * | 8/2018 | ........... | B62D 5/0454 |
| KR | 20200021345 A * | 2/2020 | | |
| KR | 20200026506 A * | 3/2020 | .......... | F16F 15/1245 |

* cited by examiner

*Primary Examiner* — Bobby Rushing, Jr.
(74) *Attorney, Agent, or Firm* — Harvest IP Law, LLP

(57) ABSTRACT

The present disclosure is direction to a stopper disposed in a driver for a steering apparatus which includes a worm gear, a bearing supporting rotation of the worm gear, and a damper buffering an impact of the bearing is provided, the stopper including: an annular body having a through hole therein allowing one side of the worm gear to pass through; and a leg on the annular body to protrude toward the damper along an axial direction of the worm gear.

12 Claims, 5 Drawing Sheets

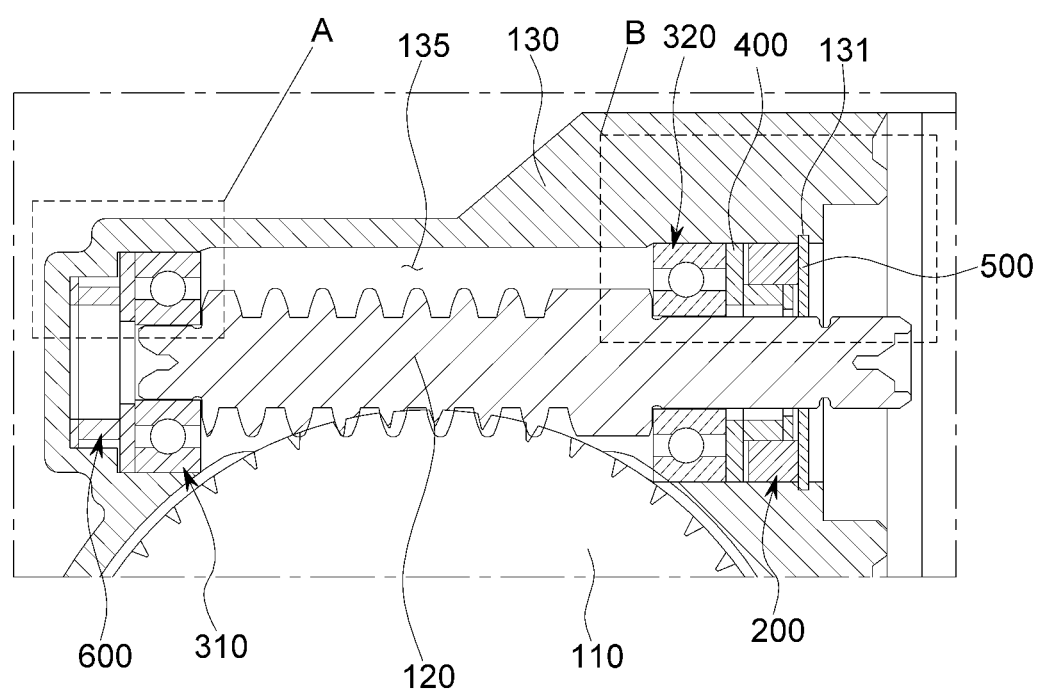
[FIG.1.]

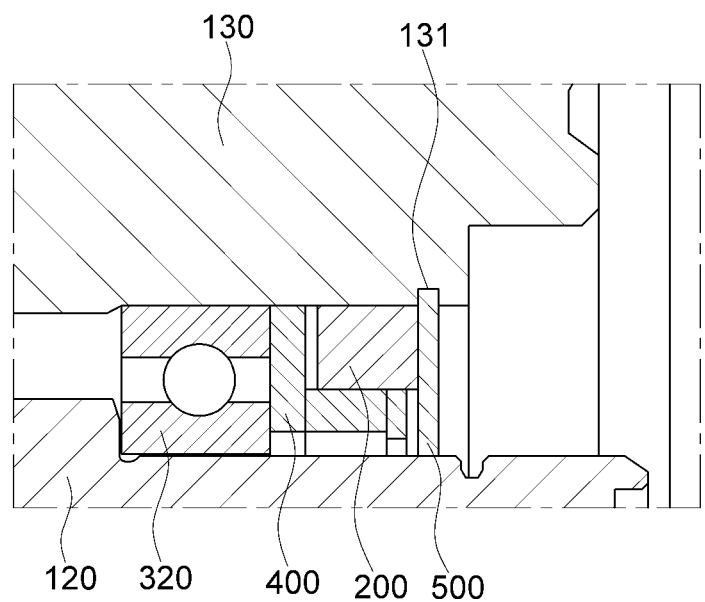
[FIG.2.]

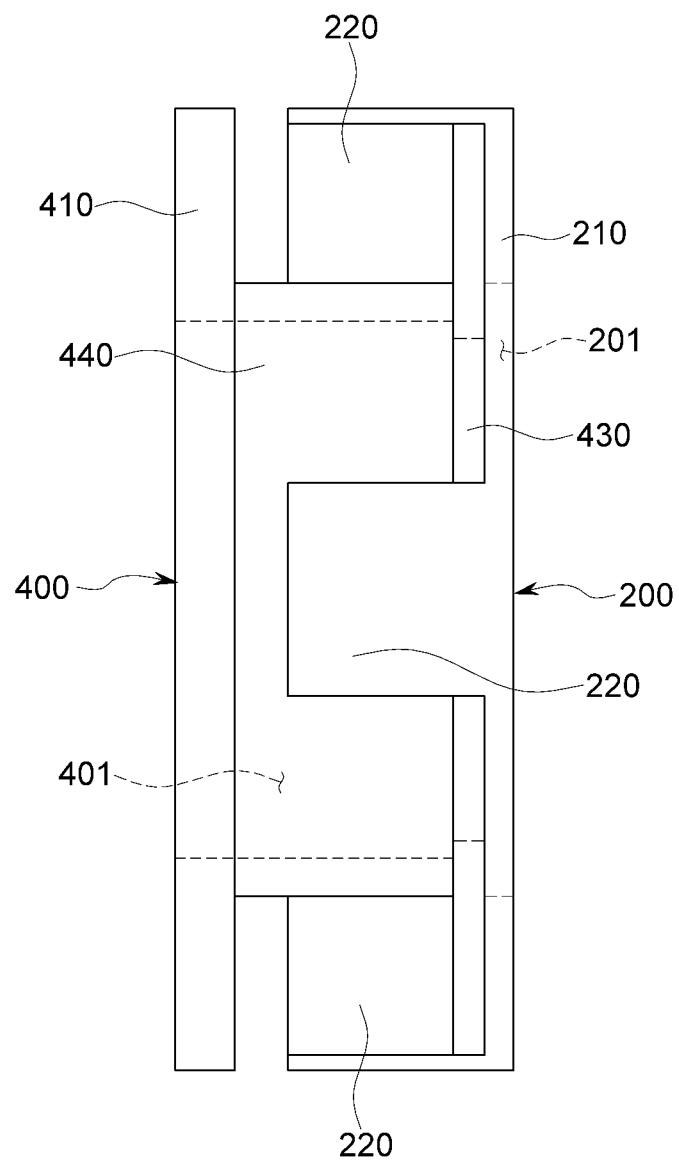
[FIG.3.]

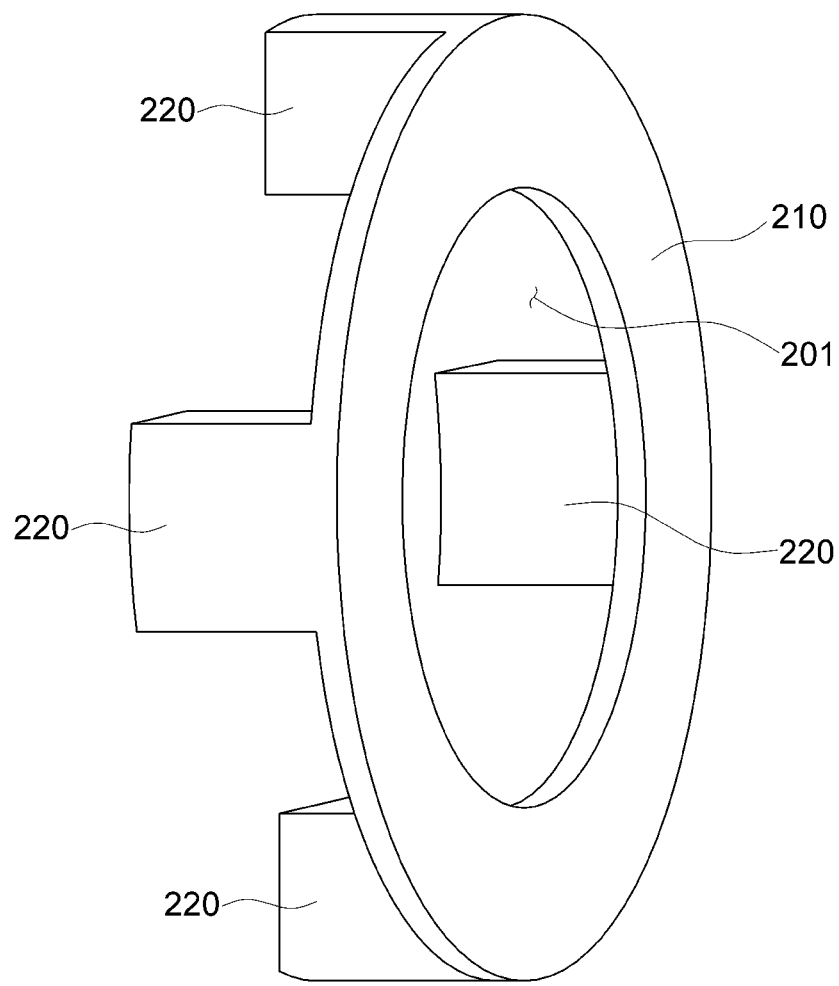
[Fig.4]

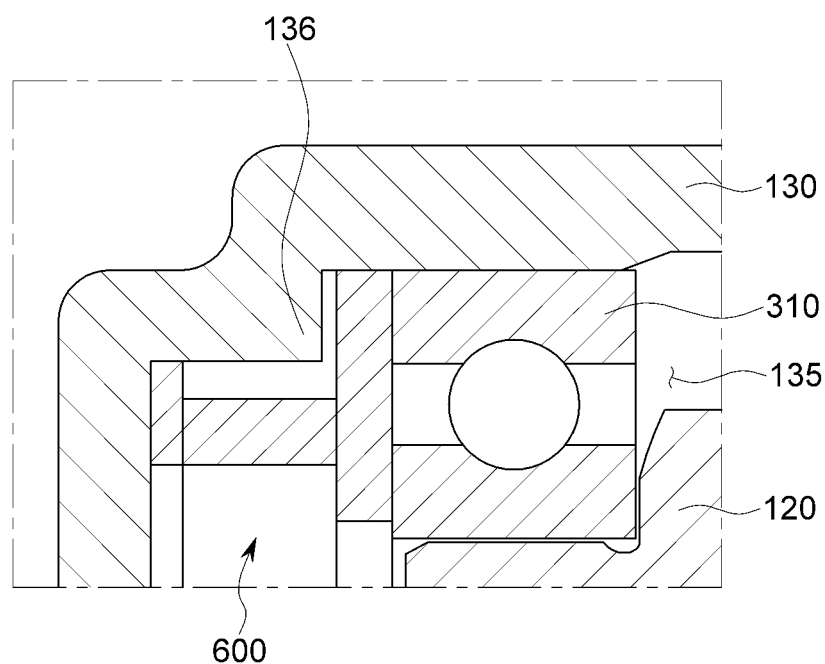
[FIG.5.]

STOPPER AND DRIVER FOR STEERING
APPARATUS HAVING THE SAME

CROSS-REFERENCE TO RELATED APPLICATION

This application claims priority to Korean Patent Application No. 10-2021-0013991, filed on Feb. 1, 2021, and all the benefits accruing therefrom under 35 U.S.C. § 119, the content of which in their entirety is herein incorporated by reference.

BACKGROUND

1. Field

Embodiments of the present disclosure relate to a stopper and a driver for a steering apparatus including the stopper, and more particularly, to a stopper and a driver for a steering apparatus including the stopper capable of reducing noise generation when in contact with a damper and preventing damage to a bearing.

2. Description of the Related Art

In general, a steering apparatus allows a wheel to be rotated by an operator's manipulation of a steering wheel. In this case, a driver (e.g., driving unit) of the steering apparatus provides auxiliary torque such that rotation or a rotation angle of the wheel is smooth according to the steering wheel operated by the operator. That is, the driver for the steering apparatus provides auxiliary torque to enable power steering operation.

Gears or the like is disposed in the driver, and when an external impact is transmitted to the gears or the like, there is a problem in that meshing of one gear with another gear may be disengaged (e.g., deviated), or in that a bearing which supports rotation may be damaged.

Damage to the bearing or the like is disadvantageous in that it generates noise inside the driver or costs for its replacement. Specifically, when an impact is transmitted in an axial direction of the worm gear, the worm gear and the bearing supporting the rotation may be damaged. Accordingly, there is a problem in that it is difficult for the worm gear receiving a power from a driving motor to effectively transmit the power provided by the driving motor to the worm wheel meshing with the worm gear.

That is, due to the damage to the worm gear or bearing, loss of the power transmitted by the driving motor may occur when transmitted to the worm wheel. The generated noise may increase the driver's auditory fatigue, and may be transmitted to the outside as the noise of the vehicle itself.

SUMMARY

Aspects of embodiments of the present disclosure are directed to a stopper and a driver for a steering apparatus including the stopper capable of reducing damage to a bearing and a worm gear and reducing noise that may occur due to the damage.

According to an embodiment, a stopper disposed in a driver for a steering apparatus which includes a worm gear, a bearing supporting rotation of the worm gear, and a damper buffering an impact of the bearing is provided, the stopper including: an annular body having a through hole therein allowing one side of the worm gear to pass through; and a leg on the annular body to protrude toward the damper along an axial direction of the worm gear.

In some embodiments, one side of the leg may be spaced apart from one area of the damper.

In some embodiments, the leg may include a plurality of legs spaced apart from each other on the annular body around the through hole.

In some embodiments, the stopper may include a plastic material.

According to an embodiment, a driver for a steering apparatus providing an auxiliary torque of the steering apparatus includes: a driver housing in which an installation area is formed; a worm gear disposed in the installation area; a first bearing rotatably supporting one side of the worm gear; a damper through which one side of the worm gear supported by the first bearing passes, the damper buffering an impact in an axial direction of the worm gear; and a stopper through which one side of the worm gear passes, the stopper restricting movement of the damper in the axial direction of the worm gear.

In some embodiments, the driver for the steering apparatus may further include a snap ring supporting the stopper to the driver housing.

In some embodiments, the driver housing may include a snap ring recess formed concavely such that a portion of an outer circumference of the snap ring is inserted and supported.

In some embodiments, the damper may be disposed between the bearing and the stopper.

In some embodiments, the damper may include: a first damper support supporting a side surface of the bearing; a second damper support supporting the stopper and spaced apart from the first damper support; and a connector connecting the first damper support and the second damper support.

In some embodiments, the stopper may include: an annular body having a through hole through which one side of the worm gear passes; and a plurality of legs spaced apart from each other on the annular body.

In some embodiments, one side of the leg may surround an area of an outer circumferential surface of the connector and may be spaced apart from the first damper support.

In some embodiments, one side of the leg may face another surface of the first damper support which is opposite to one surface of the first damper support facing a side surface of the bearing.

In some embodiments, the driver for the steering apparatus may further include: a second bearing rotatably supporting another side of the worm gear; and an auxiliary damper disposed between the driver housing and the second bearing and buffering an impact in the axial direction of the worm gear.

In some embodiments, the stopper may include a plastic material.

BRIEF DESCRIPTION OF THE DRAWINGS

FIG. 1 illustrates a cross-section illustrating a driver for a steering apparatus according to an embodiment of the present disclosure.

FIG. 2 is an enlarged view illustrating area B of FIG. 1.

FIG. 3 illustrates a damper and a stopper of FIG. 1.

FIG. 4 is a perspective view illustrating the damper of FIG. 1.

FIG. 5 is an enlarged view illustrating area A of FIG. 1.

DETAILED DESCRIPTION

Hereinafter, with reference to the accompanying drawings, embodiments of the present disclosure will be described in detail such that those of ordinary skill in the art to which the present disclosure pertains may easily implement the inventive concept of the present disclosure. The present disclosure may be embodied in many different forms and is not limited to the embodiments described herein.

It is noted that the drawings are schematic and not drawn to scale. Relative dimensions and proportions of parts in the drawings are illustrated exaggerated or reduced in size for clarity and convenience in the drawings, and any dimensions are illustrative only and not limiting. The same reference numerals are used to indicate like features to the same structural element or part appearing in two or more drawings.

The embodiments of the present disclosure specifically represent an ideal embodiment of the present disclosure. Accordingly, various modifications of the views are expected. Accordingly, the embodiments are not limited to a specific shape of the illustrated area, and includes, for example, a shape modification by manufacturing.

Hereinafter, a stopper 200 according to an embodiment of the present disclosure will be described with reference to FIGS. 1 to 4.

The stopper 200 is disposed in a driver 101 of a steering apparatus as illustrated in FIGS. 1, 2 and 4.

The driver 101 of the steering apparatus includes a worm gear 120, a bearing 320, and a damper 400. Specifically, the driver 101 of the steering apparatus provides an auxiliary torque of the steering apparatus to smoothly rotate a wheel when an operator rotates a steering wheel.

The worm gear 120 is meshed (e.g., engaged) with the worm wheel 110 to provide an auxiliary torque. The worm gear 120 may be coupled to an electric motor (not illustrated) to be rotated. The worm gear 120 of the present disclosure may be a shaft formed with teeth.

The bearing 320 supports the rotation of the worm gear 120. In addition, the damper 400 is disposed to be inserted into one side of the worm gear 120 to prevent an impact from being applied to the bearing 320. The damper 400 may be disposed to be more adjacent to one end of the worm gear 120 than the bearing 320 is thereto.

The stopper 200 includes an annular body 210 and a leg 220, as illustrated in FIGS. 2 and 4. Specifically, the stopper 200 may restrict (e.g., limit, confine, etc.) movement of the damper 400 in an axial direction of the worm gear 120.

The annular body 210 has a through hole 201 formed therein. One side of the worm gear 120 may be disposed through the through hole 201.

The leg 220 may be formed on the annular body 210 to protrude along an axial direction of the worm gear 120. In addition, one side of the leg 220 may be formed to protrude toward the damper 400. Specifically, one side of the leg 220 may be formed to extend along the axial direction of the worm gear 120 from the annular body 210 to face one area of the damper 400.

Accordingly, in the stopper 200 according to an embodiment of the present disclosure, the leg 220 may protrude toward the damper 400, thereby restricting the damper 400 from moving in the axial direction of the worm gear 120.

In addition, one side of the leg 220 of the stopper 200 according to an embodiment of the present disclosure may be spaced apart from the damper 400.

One side of the leg 220 may be disposed to be spaced apart from one area of the damper 400. Specifically, one side of the leg 220 extending to face one area of the damper 400 may be disposed to be spaced apart from the one area of the damper 400. That is, one end of the extending leg 220 may be disposed to be spaced apart from one area of the damper 400.

Accordingly, a collision between one end of the leg 220 and one area of the damper 400 may be effectively prevented. When a collision occurs between one end of the leg 220 and one area of the damper 400, noise may be generated in the driver 101 of the steering apparatus. However, according to an embodiment, one end of the leg 220 is spaced apart from one area of the damper 400, and it is possible to effectively prevent noise generation due to a collision between them.

In addition, a plurality of legs 220 of the stopper 200 according to an embodiment of the present disclosure may be spaced apart from each other on the annular body 210.

The plurality of legs 220 may be spaced apart from each other on the annular body 210 around the through hole 201. The leg 220 may maintain a separation distance between one area of the damper 400 and the stopper 200 and restrict movement of the damper 400 in the axial direction of the worm gear 120.

Specifically, the plurality of legs 220 may be disposed to be adjacent more to an outer circumference of the annular body 210 rather than an inner circumference of the annular body 210. In addition, a portion of the damper 400 may be disposed between the plurality of legs 220. In addition, one end of the plurality of legs 220 may be disposed to face one surface of a remaining portion of the damper 400.

In addition, the stopper 200 according to an embodiment of the present disclosure may include a plastic material.

The stopper 200 may include or be formed of a plastic material. Accordingly, even when a contact between the stopper 200 and the damper 400 occurs, noise generation may be reduced. In addition, the stopper 200 may include or be formed of a plastic material, and thus it may have its own elasticity compared to metal and restrict movement of the damper 400 in the axial direction of the worm gear 120.

Accordingly, the stopper 200 according to an embodiment of the present disclosure may restrict movement of the damper 400 in the axial direction of the worm gear 120, and reduce noise that may occur due to a collision between the damper 400 and the stopper 200.

Hereinafter, the driver 101 of the steering apparatus according to an embodiment of the present disclosure will be described with reference to FIGS. 1 to 5.

As illustrated in FIG. 1, the driver 101 of the steering apparatus includes a driver housing 130, a worm gear 120, a first bearing 320, a damper 400, and a stopper 200. In addition, the driver 101 of the steering apparatus provides an auxiliary torque of the steering apparatus such that steering of the wheel is smoothly controlled by the steering wheel operated by the operator.

An installation area 135 may be formed in the driver housing 130. In addition, the driver housing 130 may support an electric motor (not illustrated). Specifically, one side of the installation area 135 may be opened such that bearings, the damper 400, the stopper 200, and the worm gear 120 may be installed.

The worm gear 120 may be disposed in the installation area 135, and may be disposed such that a toothed area may be meshed with an outer circumferential surface of the worm wheel 110 disposed in the driver housing 130. Specifically, a central axis of rotation of the worm gear 120 and a central axis of rotation of the worm wheel 110 may be arranged to cross each other. In addition, the worm gear 120 may be coupled to an electric motor (not illustrated) to receive rotational force. In addition, the worm gear 120 may be supported in the driver housing 130. That is, one end of the worm gear 120 may be connected to the electric motor.

The first bearing 320 may rotatably support one side of the worm gear 120. Specifically, an inner circumferential surface of the first bearing 320 may support one side of the worm gear 120 to support rotation of the worm gear 120. In addition, one area of an outer circumferential surface of the first bearing 320 may be supported on an inner circumferential surface of the installation area 135 of the driver housing 130.

The first bearing 320 may be the same as the above-described bearing 320.

One side of the worm gear 120 supported by the first bearing 320 passes through the damper 400. In addition, the damper 400 may buffer an impact in the axial direction of the worm gear 120. Specifically, when an impact in the axial direction of the worm gear 120 is applied, the damper 400 may buffer an impact caused by movement of the first bearing 320 and the worm gear 120. In addition, a portion of an outer circumferential surface of the damper 400 may contact an inner circumferential surface of the driver housing 130.

One side of the worm gear 120 passes through the stopper 200. In addition, the stopper 200 restricts the damper 400 from moving in the axial direction of the worm gear 120. Specifically, the stopper 200 may restrict movement of the damper 400 and the worm gear 120 in the axial direction of the worm gear 120 in the installation area 135 of the driver housing 130.

Accordingly, the driver 101 of the steering apparatus according to an embodiment of the present disclosure may buffer or restrict movement of the first bearing 320 and the worm gear 120 in the axial direction of the worm gear 120 by virtue of the damper 400 and the stopper 200. Accordingly, the driver 101 of the steering apparatus may prevent meshing of the worm wheel 110 and the worm gear 120 from being disengaged due to movement in the axial direction of the worm gear 120. In addition, the driver 101 of the steering apparatus may reduce damage and breakage to the first bearing 320 due to movement in the axial direction of the worm gear 120.

That is, the driver 101 of the steering apparatus according to an embodiment of the present disclosure may effectively transmit, to the worm wheel 110, a power generated according to rotation of the worm gear 120, and may effectively prevent damage to the worm wheel 110, the worm gear 120, and the first bearing 320.

In addition, as illustrated in FIG. 2, the driver 101 of the steering apparatus according to an embodiment of the present disclosure may further include a snap ring 500.

The snap ring 500 may support the stopper 200 to the driver housing 130. Specifically, the snap ring 500 may prevent the first bearing 320, the damper 400, and the stopper 200 from moving in the axial direction of the worm gear 120 to escape to the outside of the driver housing 130. That is, the snap ring 500 may be supported on an inside of the driver housing 130 to prevent the first bearing 320, the damper 400, and the worm gear 120 from escaping toward an open side of the installation area 135 of the driver housing 130.

In addition, the snap ring 500 may be supported by the driver housing 130 to prevent the stopper 200 from escaping in the axial direction of the worm gear 120 when the worm gear 120 rotates.

In the installation area 135 of the driver housing 130, a diameter of an inner circumferential surface of the installation area 135 in which the first bearing 320, the damper 400, and the stopper 200 are formed may be the same.

Accordingly, the driver 101 of the steering apparatus according to an embodiment of the present disclosure may effectively prevent the stopper 200 and elements supported by the stopper 200 from escaping in the axial direction of the worm gear 120 through the use of the snap ring 500 without a complicated configuration.

In addition, as illustrated in FIG. 2, the driver housing 130 of the driver 101 of the steering apparatus according to an embodiment of the present disclosure may include a snap ring recess 131.

The snap ring recess 131 may be concavely formed in the driver housing 130. The snap ring recess 131 may be formed in a ring shape so that a portion of an outer circumference of the snap ring 500 may be inserted and supported. In addition, the operator assembling the driver 101 of the steering apparatus may couple the worm gear 120, the first bearing 320, the damper 400, and the stopper 200, and then may assemble the snap ring 500 to be inserted in the snap ring recess 131.

Specifically, the snap ring recess 131 may be concavely formed in the installation area 135 of the driver housing 130 along an outer circumference direction of the axial direction of the worm gear 120. That is, an inner diameter of the snap ring recess 131 may be relatively larger than a diameter of an inner circumferential surface of the installation area 135 in which the first bearing 320, the damper 400, and the stopper 200 are formed.

In addition, the damper 400 of the driver 101 of the steering apparatus according to an embodiment of the present disclosure may be disposed between the bearing 320 and the stopper 200.

The damper 400 may be supported on a side surface of the bearing 320 and one area of the stopper 200. Specifically, the damper 400 may be disposed between the bearing 320 and the stopper 200 to effectively buffer an impact applied in the axial direction of the worm gear 120 from being transmitted to the bearing 320.

In addition, as illustrated in FIG. 3, the damper 400 according to an embodiment of the present disclosure may include a first damper support 410, a second damper support 430, and a connector 440.

The damper 400 has a damper through hole 401 through which one side of the worm gear 120 may pass. Specifically, the damper 400 may be formed in an annular shape in which a damper through hole 401 is formed.

The first damper support 410 may support a side surface of the bearing 320. Specifically, one surface of the first damper support 410 may support a side surface of the bearing 320. In addition, an outer circumference of the first damper support 410 may be supported in the installation area 135.

The second damper support 430 may support the stopper 200. In addition, the second damper support 430 may be spaced apart from the first damper support 410 in the axial direction of the worm gear 120. That is, the second damper support 430 may be disposed relatively farther from the bearing 320 than the first damper support 410 is therefrom. In addition, a diameter of an outer circumference of the second damper support 430 may be relatively smaller than a diameter of an outer circumference of the first damper support 410.

One surface of the second damper support 430 may be supported on one area of the stopper 200.

For example, the first damper support 410 and the second damper support 430 may be formed in a washer shape.

The connector 440 may be disposed between the first damper support 410 and the second damper support 430. In addition, a diameter of an outer circumference of the connector 440 may be relatively smaller than that of the second damper support 430. That is, the connector 440 may be disposed between the first damper support 410 and the second damper support 430 spaced apart from each other to connect them.

A damper through hole 401 may be formed to pass through the first damper support 410, the connector 440, and the second damper support 430.

In addition, as illustrated in FIG. 4, the stopper 200 of the driver 101 of the steering apparatus according to an embodiment of the present disclosure may include an annular body 210 and a leg 220.

A through hole 201 may be formed in the annular body 210 to guide one side of the worm gear 120 to pass therethrough. An outer circumference of the annular body 210 may be disposed to face the inner circumference of the installation area 135.

A plurality of the legs 220 may be disposed to be spaced apart from each other on the annular body 210. Specifically, the plurality of legs 220 may be disposed on one surface of the annular body 210 to be radially spaced apart from each other around the through hole 201. In addition, another surface of the annular body 210 opposite to one surface of the annular body 210 may be disposed to face the snap ring 500. The legs 220 radially spaced apart from each other may restrict movement in the axial direction of the worm gear 120 so as to effectively prevent collision between the first bearing 320 and the worm wheel 110 as illustrated in FIG. 1.

In addition, the leg 220 may extend to protrude from one surface of the annular body 210 in the axial direction of the worm gear 120. As an example, a cross-section of the stopper 200 in a direction parallel to the axial direction of the through hole 201 may be formed in a substantially "C" shape rotated 180 degrees.

In addition, the stopper 200 according to an embodiment of the present disclosure may include a plastic material.

The annular body 210 and the leg 220 may be unitarily (e.g., integrally, monolithically, etc.) formed to include a plastic material to have their own elasticity. Accordingly, it is possible to reduce noise generation even when the damper 400 and the stopper 200 come into contact with each other due to an impact in the axial direction of the worm gear 120.

This reduction in noise generation may reduce auditory fatigue of the driving operator. In addition, it is possible to effectively prevent damage to the damper 400 or other elements that may be caused by contact and collision with the stopper 200. In addition, the stopper 200 is made of a plastic material, so it is lighter in weight than metal and the manufacturing cost may be reduced.

In addition, as illustrated in FIG. 3, one side of the leg 220 according to an embodiment of the present disclosure may surround (e.g., cover) an area of an outer circumferential surface of the connector 440 and may be disposed to be spaced apart from the first damper support 410.

Another side of the leg 220 may be supported on one surface of the annular body 210, and one side of the leg 220 may extend along the central axis direction of the through hole 201 of the annular body 210 in a direction away from one surface of the annular body 210. In addition, the plurality of legs 220 may be formed on one surface of the annular body 210 to be spaced apart from each other in a radial direction with respect to a central axis direction of the through hole 201.

In addition, one side of the protruding leg 220 may be disposed to surround an area of the outer circumferential surface of the connector 440. Specifically, one surface of the second damper support 430 may be supported on one surface of the annular body 210. That is, one surface of the second damper support 430 disposed relatively far from the connector 440 may be supported on one surface of the annular body 210.

In other words, portions of the second damper support 430 and the connector 440 which are portions of the damper 400 may be accommodated in an inner area of the stopper 200 which includes one surface of the annular body 210 and in which the plurality of legs 220 extend.

In addition, one side of the leg 220 may be disposed to be spaced apart from the first damper support 410.

In addition, one end of the leg 220 according to an embodiment of the present disclosure may be disposed to face another surface of the first damper support 410 as illustrated in FIG. 3.

Another surface of the first damper support 410 may be a surface opposite to one surface of the first damper support 410 facing a side surface of the bearing 320. One end of the leg 220 extending and protruding may be disposed to face another surface of the first damper support 410. Specifically, one end of the leg 220 extending and protruding may be spaced apart from another surface of the first damper support 410 so as not to contact another surface of the first damper support 410. That is, one end of the leg 220 may be formed to extend toward another surface of the first damper support 410, but may be spaced apart from another surface of the first damper support 410.

A length of the leg 220 extending and protruding is relatively shorter than a sum of lengths of the second damper support 430 and the connector 440 in a direction parallel to the axial direction of the worm gear 120, such that one end of the leg 220 may be spaced apart from another surface of the first damper support 410.

Accordingly, as one end of the leg 220 is spaced apart from the first damper support 410, noise due to contact between the first damper support 410 and one end of the leg 220 may be prevented, and the damper 400 may be effectively supported.

In addition, as illustrated in FIG. 5, the driver 101 of the steering apparatus according to an embodiment of the present disclosure may further include a second bearing 310 and an auxiliary damper 600.

The second bearing 310 may be disposed in the driver housing 130. In addition, the second bearing 310 may rotatably support another side of the worm gear 120. Specifically, the second bearing 310 may be disposed to be spaced apart from the first bearing 320 in the axial direction of the worm gear 120.

An outer circumferential surface of the second bearing 310 may be disposed to face the driver housing 130 and supported in the driver housing 130.

The auxiliary damper 600 may be disposed between an inner surface of the driver housing 130 and the second bearing 310. In addition, the auxiliary damper 600 may buffer an impact in the axial direction of the worm gear 120. Specifically, the auxiliary damper 600 may effectively prevent the second bearing 310 and the worm gear 120 from being damaged when another end of the worm gear 120 and the second bearing 310 collide with an inner portion of the driver housing 130.

In addition, the auxiliary damper 600 may be formed in the same configuration as the damper 400 described above.

A locking projection 136 formed by a portion of the driver housing 130 protruding in the axial direction of the worm gear 120 may be formed to support an area of the auxiliary damper 600 such that the the auxiliary damper 600 and the second bearing 310 may be prevented from moving toward another side of the driver housing 130. That is, an inner diameter of another side of the driver housing 130 in which a remaining area of the auxiliary damper 600 is accommodated may be formed to be relatively smaller than an inner diameter of the driver housing 130 supporting a side surface of the second bearing 310.

In other words, an outer diameter of one area of the auxiliary damper 600 may be formed to be relatively larger than an outer diameter of another area of the auxiliary damper 600.

Accordingly, the auxiliary damper 600 and the second bearing 310 may effectively support rotation of another side of the worm gear 120 and buffer an impact with the driver housing 130.

In addition, the damper 400 and the auxiliary damper 600 of the driver 101 of the steering apparatus according to an embodiment of the present disclosure may include or be formed of a material including a metal.

For example, the first damper support 410 and the second damper support 430 of the damper 400 may include or be formed of a metal material, and the connector 440 may include or be formed of a rubber material. The damper 400 may perform a self-buffering role depending on the material of the connector 440.

Accordingly, even when the damper 400 and the stopper 200 of a metal portion collide with and contact each other, noise may be effectively reduced by the materials thereof.

With such a configuration, the driver 101 of the steering apparatus according to an embodiment of the present disclosure may prevent the first bearing 320 and the second bearing 310 from being damaged even when an impact in the axial direction of the worm gear 120 occurs.

In addition, the driver 101 of the steering apparatus according to an embodiment of the present disclosure may reduce noise that may be caused by contact between the damper 400 and the stopper 200, and may effectively prevent damage to the damper 400, the first bearing 320, and the worm gear 120.

As set forth hereinabove, according to embodiments of the present invention, the stopper and the driver for the steering apparatus including the stopper may effectively reduce damage to the bearing and the worm gear and reduce noise that may result from the damage. In addition, according to an embodiment of the present invention, the driver for the steering apparatus may easily prevent the worm gear, the bearing, the stopper, and the like from escaping out of the driver housing. In addition, according to an embodiment of the present invention, the driver for the steering apparatus may effectively prevent escaping by using the snap ring without processing a conventional lock nut and/or processing a cross-section of the driver housing for engaging with the lock nut.

Although the embodiments of the present invention have been described above with reference to the accompanying drawings, those skilled in the art to which the present invention pertains can understand that the present invention may be embodied in other specific forms without changing the technical spirit or essential characteristics thereof.

Therefore, embodiments described above are to be understood as illustrative only and not restrictive in all respects, and the scope of the present disclosure is indicated by the following claims. The meaning and scope of the claims, and all changes or modifications derived from the equivalent concept should be construed as being included in the scope of the present disclosure.

REFERENCE NUMERAL

101: Driver for the steering apparatus 120: Worm gear
130: Driver housing 131: Snap ring recess
135: Installation area
200: Stopper 201: Through hole
210: Annular body 220: Leg
310: Second bearing 320: Bearing, First bearing
400: Damper 410: First damper support
430: Second damper support 440: Connector
500: Snap ring 600: Auxiliary damper

What is claimed is:

1. A driver for a steering apparatus providing an auxiliary torque of the steering apparatus, the driver comprising:
a driver housing in which an installation area is formed;
a worm gear disposed in the installation area;
a first bearing rotatably supporting one side of the worm gear;
a damper through which one side of the worm gear supported by the first bearing passes, the damper buffering an impact in an axial direction of the worm gear; and
a stopper through which one side of the worm gear passes, the stopper restricting movement of the damper in the axial direction of the worm gear,
wherein the stopper comprises:
an annular body having a through hole through which one side of the worm gear passes; and
a plurality of legs spaced apart from each other on the annular body,
wherein an interior portion of each of the plurality of legs surrounds an outer circumferential surface of one area of the damper and,
wherein the damper comprises:
a first damper support supporting a side surface of the bearing;
a second damper support supporting the stopper and spaced apart from the first damper support; and
a connector connecting the first damper support and the second damper support, and surrounded by the interior portion of each of the plurality of legs,
wherein the plurality of legs is spaced apart from the first damper support in the axial direction.

2. The driver for the steering apparatus of claim 1, further comprising a snap ring supporting the stopper to the driver housing.

3. The driver for the steering apparatus of claim 2, wherein the driver housing includes a snap ring recess formed concavely such that a portion of an outer circumference of the snap ring is inserted and supported.

4. The driver for the steering apparatus of claim 1, wherein the damper is disposed between the bearing and the stopper.

5. The driver for the steering apparatus of claim 1, wherein one side of the leg faces another surface of the first damper support which is opposite to one surface of the first damper support facing a side surface of the bearing.

6. The driver for the steering apparatus of claim 1, further comprising:
   a second bearing rotatably supporting another side of the worm gear; and
   an auxiliary damper disposed between the driver housing and the second bearing and buffering an impact in the axial direction of the worm gear.

7. The driver for the steering apparatus of claim 1, wherein the stopper comprises a plastic material.

8. The driver according to claim 1,
   wherein the plurality of legs is formed to protrude toward a toothed area of the worm gear and surround one side of the worm gear passing through the annular body.

9. The driver according to claim 1,
   wherein the bearing and axial ends of the plurality of legs of the stopper are spaced apart in the axial direction.

10. The driver according to claim 1,
    wherein a diameter of an outer circumference of the connector is smaller than a diameter of an outer circumference of the first damper support.

11. The driver according to claim 10.
    wherein the diameter of the outer circumference of the connector is smaller than a diameter of an outer circumference of the second damper support.

12. The driver according to claim 11,
    wherein the diameter of the outer circumference of the connector is equal to or smaller than a diameter of a circle formed by the interior portions of the plurality of legs.

\* \* \* \* \*